(12) United States Patent
Schumacher et al.

(10) Patent No.: US 10,136,627 B1
(45) Date of Patent: Nov. 27, 2018

(54) FISHING LINE DEFLECTOR

(71) Applicants: Daniel S. Schumacher, Wild Rose, WI (US); Theodore R. Schumacher, Deerfield, WI (US)

(72) Inventors: Daniel S. Schumacher, Wild Rose, WI (US); Theodore R. Schumacher, Deerfield, WI (US)

( * ) Notice: Subject to any disclaimer, the term of this patent is extended or adjusted under 35 U.S.C. 154(b) by 437 days.

(21) Appl. No.: 15/149,253

(22) Filed: May 9, 2016

Related U.S. Application Data

(60) Provisional application No. 62/159,607, filed on May 11, 2015.

(51) Int. Cl.
| | |
|---|---|
| *A01K 97/01* | (2006.01) |
| *A01K 87/04* | (2006.01) |
| *A01K 91/06* | (2006.01) |
| *A01K 31/00* | (2006.01) |
| *A01M 31/00* | (2006.01) |

(52) U.S. Cl.
CPC .............. *A01K 97/01* (2013.01); *A01K 87/04* (2013.01); *A01K 91/06* (2013.01); *A01M 31/002* (2013.01)

(58) Field of Classification Search
CPC ........ A01K 97/01; A01K 87/04; A01K 91/06; A01M 31/002
See application file for complete search history.

(56) References Cited

U.S. PATENT DOCUMENTS

| | | | | |
|---|---|---|---|---|
| 1,713,446 | A * | 5/1929 | Peterson | B63H 5/165 416/247 R |
| 3,025,825 | A * | 3/1962 | Martinson | B63H 5/165 440/71 |
| 3,859,953 | A * | 1/1975 | Todt | B63H 5/165 440/72 |
| 4,957,459 | A * | 9/1990 | Snyder | B63H 5/165 416/247 A |
| D325,916 | S * | 5/1992 | Lanier | 440/72 |
| 5,176,550 | A * | 1/1993 | Hooper | B63H 5/165 416/247 A |
| 5,664,977 | A * | 9/1997 | Dinkowitz | B63H 20/34 440/65 |
| 2005/0254346 | A1 * | 11/2005 | Roth, II | G01S 7/521 367/188 |

\* cited by examiner

*Primary Examiner* — Daniel Pihulic
(74) *Attorney, Agent, or Firm* — Donald J. Ersler

(57) ABSTRACT

A fishing line deflection pole preferably includes a pole unit and a retention plate. The pole unit includes a clamp member, at least one pole member and a biasing extension. The clamp member includes a transducer guard and a pole receiver. The pole receiver extends upward from the transducer guard. The pole receiver includes a threaded tap. The pole member includes a threaded end and a threaded tap on an opposing end thereof. The threaded end is sized to be threadably received by the thread tap of the pole receiver. Multiple pole members may be threaded into each other to extend a length of the pole unit. The biasing extension includes a resilient pipe, which is retained on the pole receiver. The retention plate includes a pole opening formed through one end and a contact pad extending from an opposing end thereof.

18 Claims, 4 Drawing Sheets

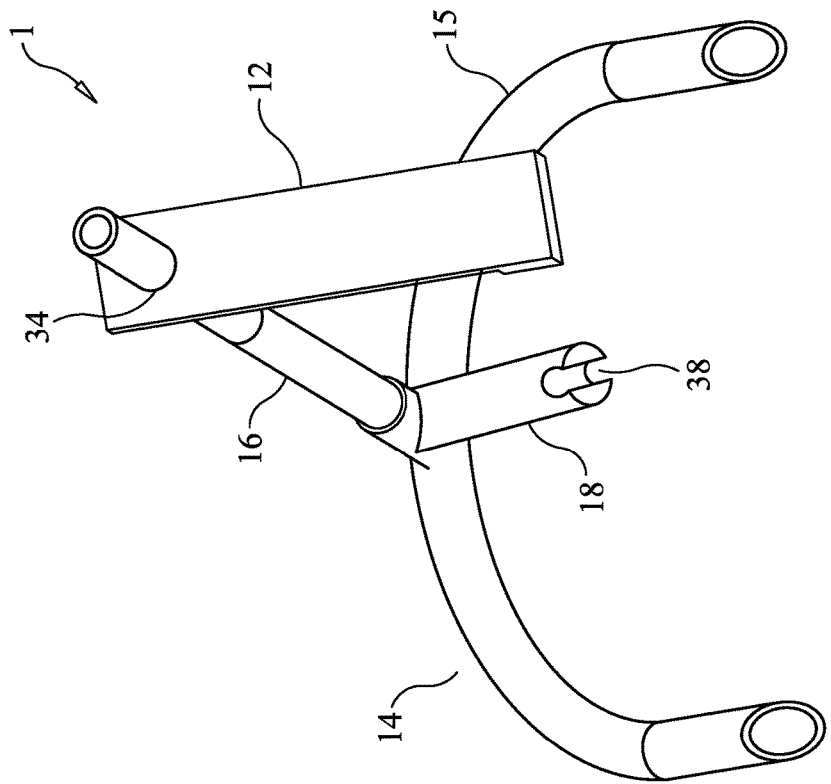
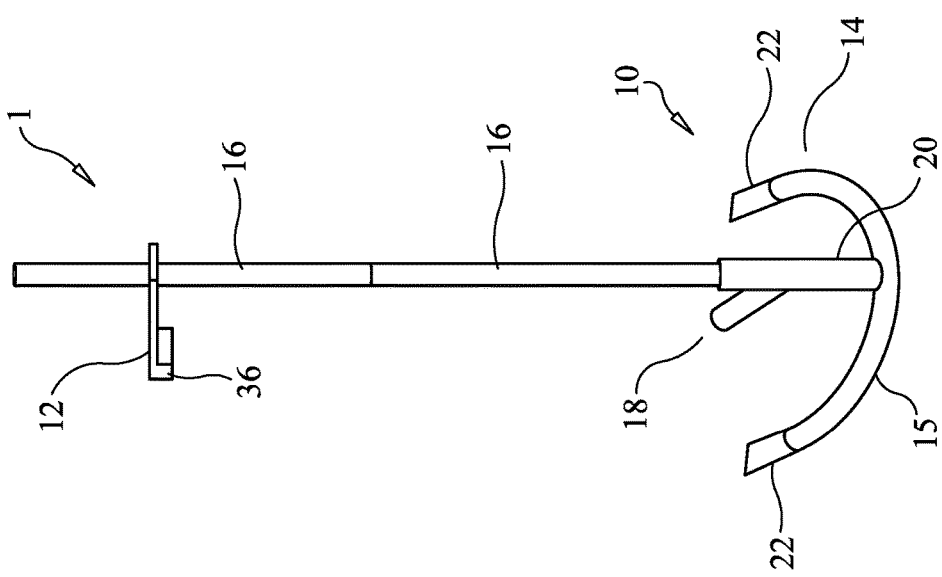
FIG. 2
FIG. 1

FISHING LINE DEFLECTOR

CROSS-REFERENCES TO RELATED APPLICATIONS

This is a utility patent application taking priority from provisional application No. 62/159,607 filed on May 11, 2015.

BACKGROUND OF THE INVENTION

Field of the Invention

The present invention relates generally to ice fishing and more specifically to a fishing line deflection pole, which protects a fishing line from getting tangled with a transducer of a fish finder.

Discussion of the Prior Art

It appears that the prior art does not teach or suggest a fishing line deflection pole, which clamps around a thickness of ice; and prevents a fishing line from being tangled with a fish finder transducer that hangs below the ice.

Accordingly, there is a clearly felt need in the art for a fishing line deflection pole, which clamps around a thickness of ice; and prevents a fishing line from being tangled with a fish finder transducer that hangs below the ice.

SUMMARY OF THE INVENTION

The present invention provides a fishing line deflection pole, which clamps around a thickness of ice. The fishing line deflection pole preferably includes a pole unit and a retention plate. The pole unit includes a clamp member, at least one pole member and a biasing extension. The clamp member includes a transducer guard and a pole receiver. The transducer guard preferably has a U-shape. The pole receiver extends upward from the transducer guard. Each leg of the transducer guard extends upward at an acute angle from a horizontal plane. The pole receiver includes a thread tap formed in a distal end. The pole member includes a threaded end and a threaded tap formed on an opposing end thereof. The threaded end is sized to be threadably received by the threaded tap of the pole receiver. Multiple pole members may be threaded into each other to extend a length of the pole unit. The biasing extension includes a resilient pipe, which is retained on the pole receiver. The retention plate includes a pole opening formed through one end and a contact pad extending from an opposing end thereof. The pole opening is sized to receive the at least one pole member.

Accordingly, it is an object of the present invention to provide a fishing line deflection pole, which clamps around a thickness of ice.

Finally, it is another object of the present invention to provide a fishing line deflection pole, which prevents a fishing line from being tangled with a fish finder transducer that hangs below the ice.

These and additional objects, advantages, features and benefits of the present invention will become apparent from the following specification.

BRIEF DESCRIPTION OF THE DRAWINGS

FIG. 1 is a side perspective view of a fishing line deflection pole in accordance with the present invention.

FIG. 2 is an enlarged top perspective view of a fishing line deflection pole in accordance with the present invention.

DETAILED DESCRIPTION OF THE PREFERRED EMBODIMENTS

Figure 4:
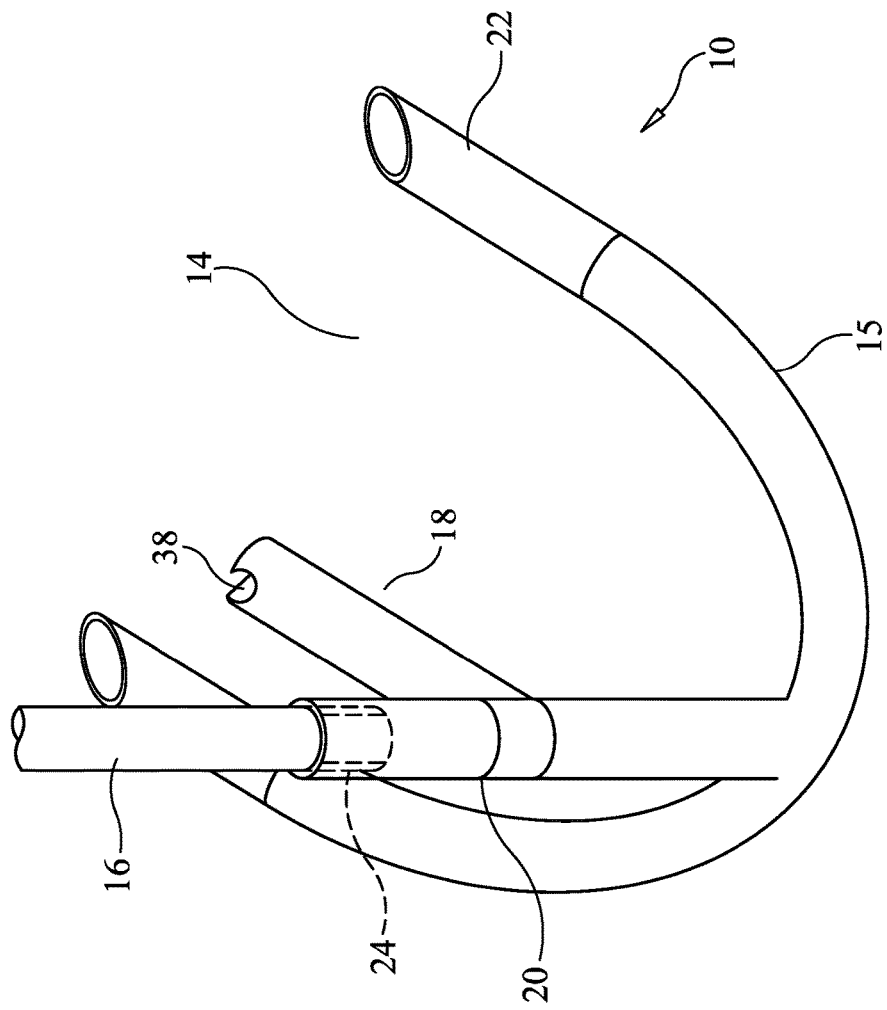
FIG. 4 is an enlarged perspective view of a clamp member of a fishing line deflection pole in accordance with the present invention.
Figure 3:
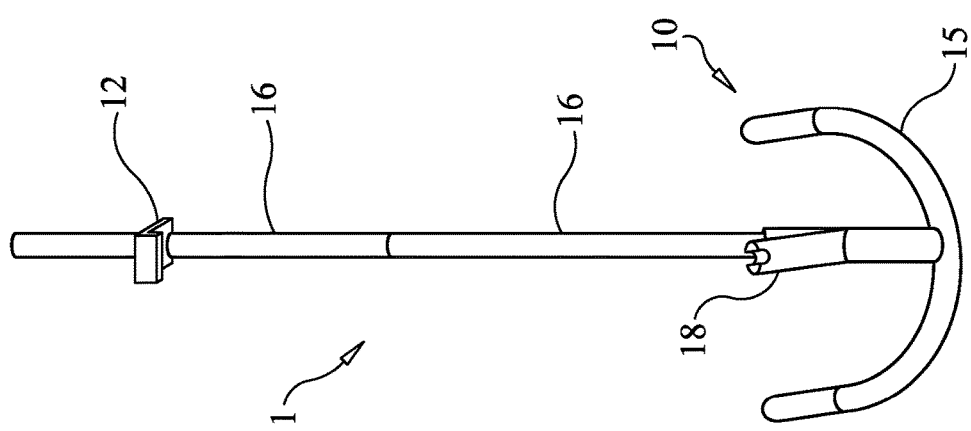
FIG. 3 is a front perspective view of a fishing line deflection pole in accordance with the present invention.
Figure 5:
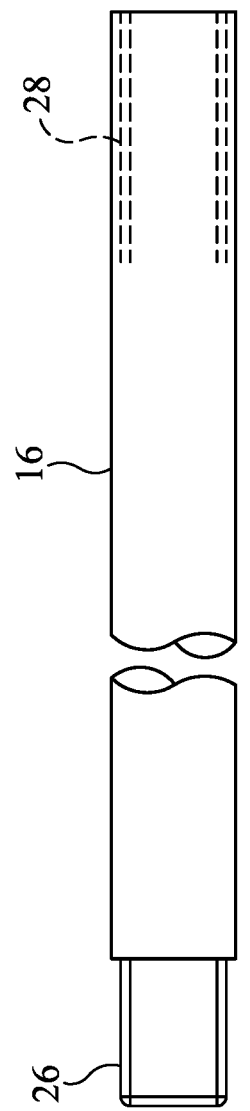
FIG. 5 is a side view of a pole member of a fishing line deflection pole in accordance with the present invention.
Figure 6:
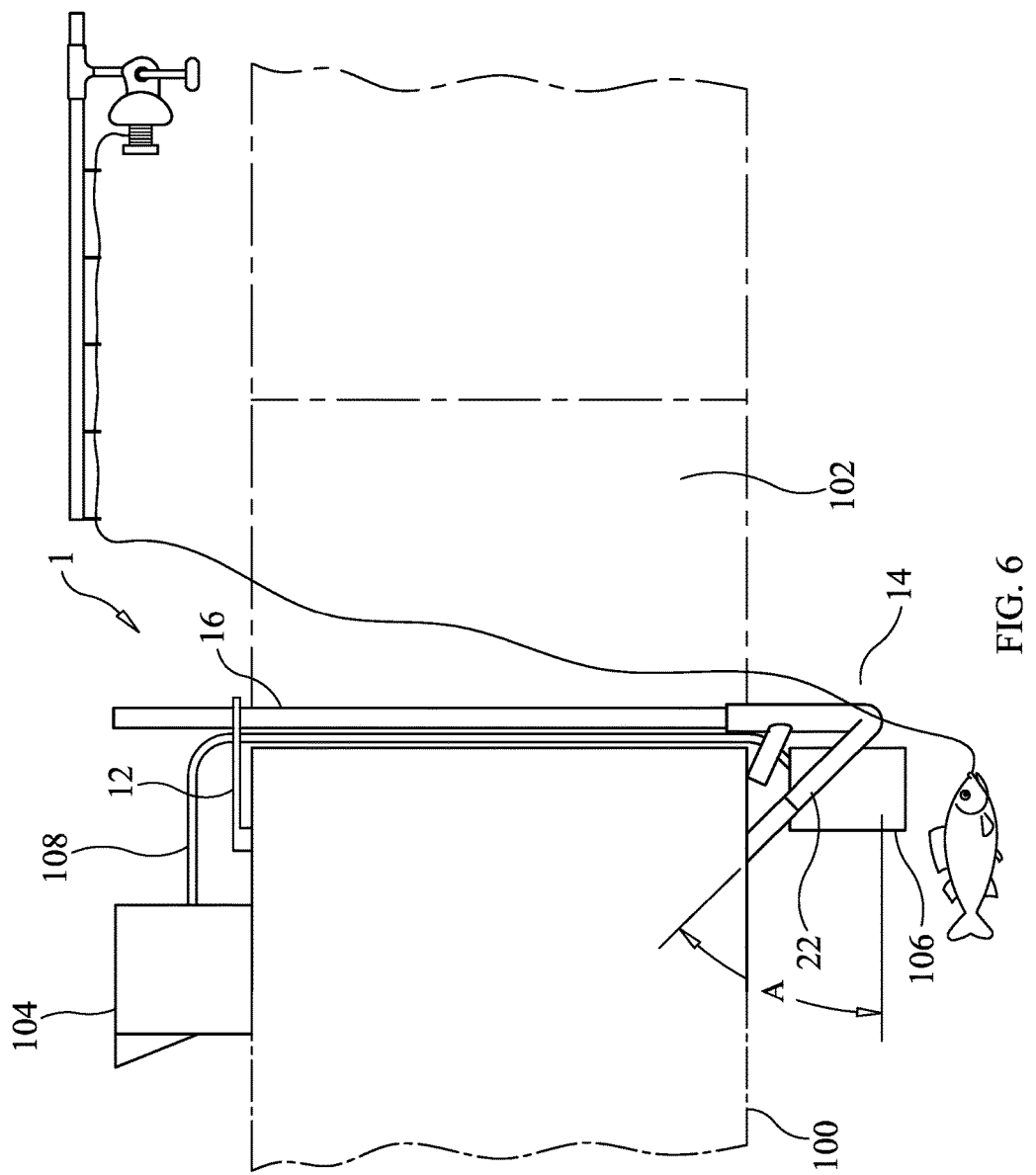
FIG. 6 is a side view of a fishing line deflection pole retained on ice in accordance with the present invention.

With reference now to the drawings, and particularly to FIG. 1, there is shown a perspective view of a fishing line deflection pole 1. With reference to FIGS. 2-4, the fishing line deflection pole 1 preferably includes a pole unit 10 and a retention plate 12. The pole unit 10 includes a clamp member 14, at least one pole member 16 and a biasing extension 18. The clamp member 14 includes a transducer guard 15 and a pole receiver 20. The transducer guard 15 preferably has a U-shape. An inner perimeter of the transducer guard provides clearance for a transducer of a fish finder. The pole receiver 20 extends upward from the transducer guard 15. With reference to FIG. 6, each angled leg 22 of the transducer guard 15 extends upward at an acute angle "A" from a horizontal plane. The pole receiver 20 includes a threaded tap 24. With reference to FIG. 5, the pole member 16 includes a threaded end 26 and a threaded tap 28 in an opposing end thereof. The threaded end 26 is sized to be threadably received by the threaded tap 24 of the pole receiver 20 and the threaded tap 28 of an adjacent pole member 16. Multiple pole members 16 may be threaded into each other to extend a length of the pole unit 1. The biasing extension 18 includes a resilient pipe 30 and a retention collar 32. The resilient pipe 30 extends upward from the retention collar 32. The resilient pipe 30 is fabricated from a resilient material. The retention collar 32 is attached to the pole receiver 20 with any suitable method or device. The retention plate 12 includes a pole opening 34 formed through one end and a contact pad 36 extending from an opposing end thereof. A line clearance slot 38 is formed in an end of the resilient pipe 30 to provide clearance for a transducer electrical line.

With reference to FIG. 6, the fishing line deflection pole 1 is preferably installed in the following manner. A hole 102 is drilled through a piece of ice 100. A transducer 106 of a fish finder 104 is placed under the biasing extension 18. The transducer electrical line 108 is placed in the line clearance slot 38. The pole member 16 is pulled upward, until a distal end of the two angled legs 22 contact a bottom of the ice 100. The resilient pipe 30 will bend and exert force against a bottom of the ice 100. The contact pad 36 of the retention plate 12 will contact a top of the ice 100. The pole opening 34 will dig into a side of the pole member 16 and retain the fishing deflection pole 1 against the ice 100.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A fishing line deflection pole comprising:
a pole unit includes a clamp member, at least one pole member and a biasing extension, said clamp member includes a transducer guard and a pole receiver, said pole receiver extends upward from said transducer guard, at least one pole member is retained in said pole receiver, said biasing extension is retained on said pole receiver; and
a retention plate includes a pole opening formed through one end thereof, said pole opening is sized to slidably receive said at least one pole member.

2. The fishing line deflection pole of claim 1 wherein:
a contact pad extending downward from an opposing end of said retention plate.

3. The fishing line deflection pole of claim 1 wherein:
said transducer guard includes a U-shape, an angled leg extends upward from each end of said U-shape.

4. The fishing line deflection pole of claim 1 wherein:
one of said at least one pole member includes a threaded end and a threaded tap formed in an opposing end thereof, said threaded end is sized to be threadably received by a threaded tap of an adjacent pole member.

5. The fishing line deflection pole of claim 4 wherein:
a pole threaded tap is formed in an end of the pole receiver, said pole threaded tap is sized to threadably receive said threaded end.

6. The fishing line deflection pole of claim 1 wherein:
a line clearance slot is formed in an end of said biasing extension, said line clearance slot is sized to receive an electrical line of a transducer of a fish finder.

7. A fishing line deflection pole comprising:
a pole unit includes a clamp member, at least one pole member and a biasing extension, said clamp member includes a transducer guard and a pole receiver, said pole receiver extends upward from said transducer guard, said transducer guard includes a U-shape, at least one pole member is retained in said pole receiver, said biasing extension is retained on said pole receiver; and
a retention plate includes a pole opening formed through one end thereof, said pole opening is sized to slidably receive said at least one pole member.

8. The fishing line deflection pole of claim 7 wherein:
a contact pad extending downward from an opposing end of said retention plate.

9. The fishing line deflection pole of claim 7 wherein:
an angled leg extends upward from each end of said U-shape.

10. The fishing line deflection pole of claim 7 wherein:
one of said at least one pole member includes a threaded end and a threaded tap formed in an opposing end thereof, said threaded end is sized to be threadably received by a threaded tap of an adjacent pole member.

11. The fishing line deflection pole of claim 10 wherein:
a pole threaded tap is formed in an end of the pole receiver, said pole threaded tap is sized to threadably receive said threaded end.

12. The fishing line deflection pole of claim 7 wherein:
a line clearance slot is formed in an end of said biasing extension, said line clearance slot is sized to receive an electrical line of a transducer of a fish finder.

13. A fishing line deflection pole comprising:
a pole unit includes a clamp member, at least one pole member and a biasing extension, said clamp member includes a transducer guard and a pole receiver, said pole receiver extends upward from said transducer guard, at least one pole member is retained in said pole receiver, said biasing extension is retained on said pole receiver, said biasing extension is fabricated from a resilient material; and
a retention plate includes a pole opening formed through one end thereof, said pole opening is sized to slidably receive said at least one pole member.

14. The fishing line deflection pole of claim 13 wherein:
a contact pad extending downward from an opposing end of said retention plate.

15. The fishing line deflection pole of claim 13 wherein:
said transducer guard includes a U-shape, an angled leg extends upward from each end of said U-shape.

16. The fishing line deflection pole of claim 13 wherein:
one of said at least one pole member includes a threaded end and a threaded tap formed in an opposing end thereof, said threaded end is sized to be threadably received by a threaded tap of an adjacent pole member.

17. The fishing line deflection pole of claim 16 wherein:
a pole threaded tap is formed in an end of the pole receiver, said pole threaded tap is sized to threadably receive said threaded end.

18. The fishing line deflection pole of claim 13 wherein:
a line clearance slot is formed in an end of said biasing extension, said line clearance slot is sized to receive an electrical line of a transducer of a fish finder.

* * * * *